April 5, 1966  G. W. MURPHY  3,244,612
DEMINERALIZATION ELECTRODES AND FABRICATION
TECHNIQUES THEREFOR
Filed Nov. 29, 1961
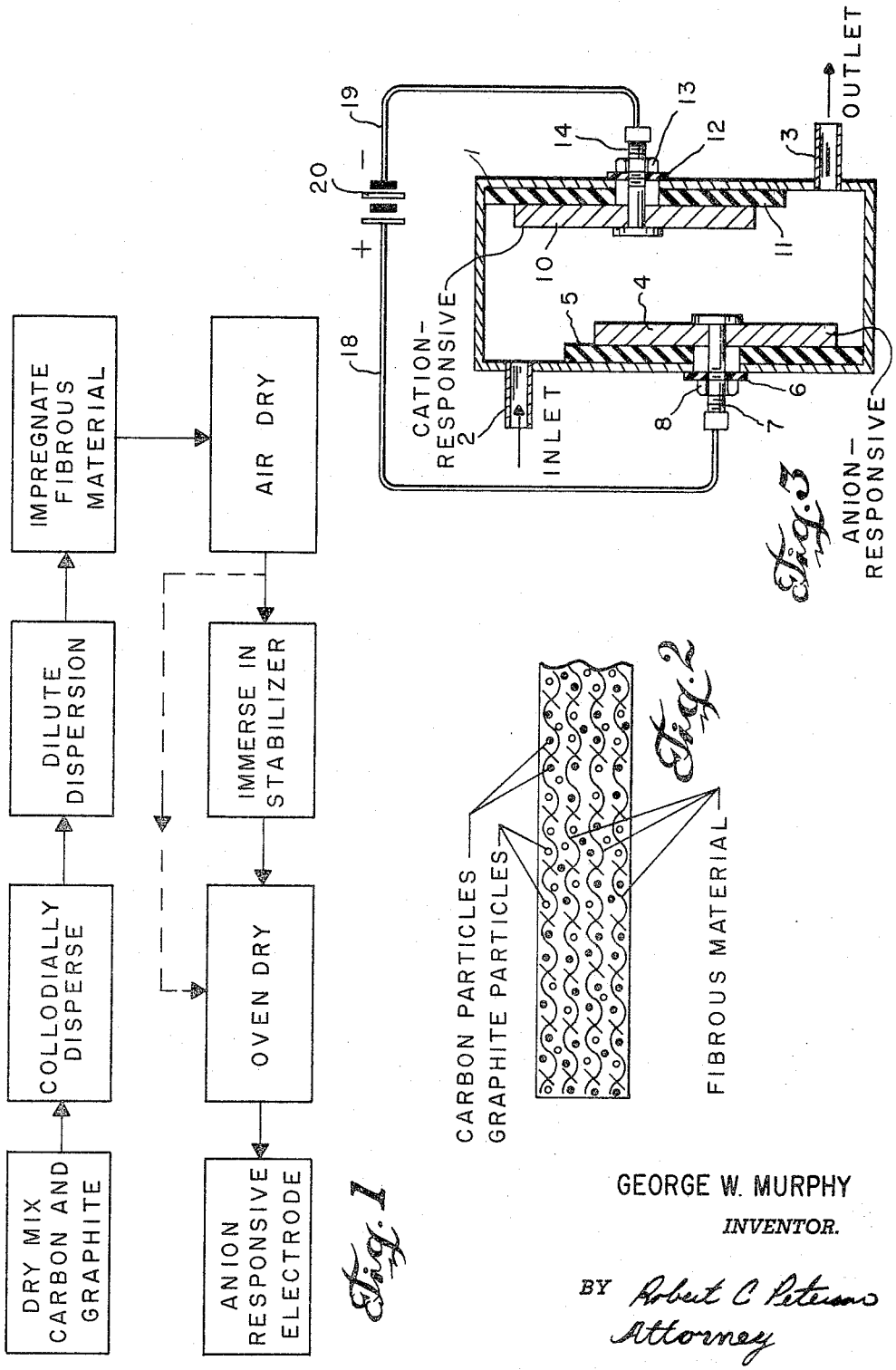
GEORGE W. MURPHY
INVENTOR.
BY Robert C Peterson
Attorney

United States Patent Office 3,244,612
Patented Apr. 5, 1966

3,244,612
DEMINERALIZATION ELECTRODES AND
FABRICATION TECHNIQUES THEREFOR
George W. Murphy, Norman, Okla., assignor to the
United States of America as represented by the Secretary of the Interior
Filed Nov. 29, 1961, Ser. No. 155,594
15 Claims. (Cl. 204—294)

This invention relates to electrochemical demineralization electrodes and more particularly to anion-responsive electrodes and fabrication thereof for use in demineralization processes.

Demineralization of saline water may be achieved by various methods. One such method is the electric membrane or "electrodialysis" process of purifying water. Basically, if a D.C. potential is applied between a cathode and an anode immersed in saline water, all the anions in the water move in one direction whereas all the cations move in the opposite direction. By placing cation-permeable and anion-permeable membranes alternately between a series of cathodes and anodes to provide sealed compartments, saline water placed therein may be demineralized by applying a D.C. potential to the electrodes. In alternate compartments anions and cations will pass through their respective permeable membranes leaving demineralized water therein. The interposing membrane compartments will become concentrated with ions since the cation-permeable membranes prevent further movement of anions and the anion-permeable membranes prevent further movement of cations.

Electrochemical techniques have been developed to some degree for demineralization of saline water by utilizing porous electrodes, one being silver-silver chloride which is anion-responsive and another being a tannic acid dispersion of graphite on a backing material which is cation-responsive. In saline water these electrodes with a D.C. potential thereacross will adsorb anions and cations from the saline water achieving purification thereof. For reasonable electrochemical efficiency, porous electrodes must possess high electrical conductivity, good chemical and physical stability, and large selective ion removal capacity. Such properties are achieved by carbon and graphite; however, electrodes made from carbon and graphite are usually cation-responsive only.

The invention herein relates to a method of fabricating an improved anion-responsive electrode. In accordance with the invention carbon and graphite are mixed and then colloidally dispersed in a solution of an organic polyelectrolyte which has a quaternized nitrogen group thereon. This dispersion is impregnated in a backing material to form a porous mixed carbon electrode from the colloidal dispersion of the carbon and graphite. The electrode is air dried, after which it may be immersed in a stabilizer solution, and then oven dried to obtain the finished anion-responsive electrode. By treating carbon and graphite, which are normally not anion-responsive according to the invention, anion-responsiveness is achieved.

It is therefore an object of the invention to provide an anion-responsive electrode containing the desirable properties attributed to carbon and graphite therein;

It is another object of the invention to provide a method of making anion-responsive electrodes comprising the steps of impregnating a backing material with carbon and graphite colloidally dispersed in an organic polyelectrolyte containing quaternary nitrogen atoms;

It is a further object of the invention to provide an anion-responsive electrode of carbon and graphite dispersed in an organic polyelectrolyte containing quaternary nitrogen atoms;

It is still another object of the invention to provide an anion-responsive porous electrode of carbon and graphite which is dispersed in polyvinylimidazole-methhalide and then is impregnated in a porous backing material;

It is still another object of the invention to provide a method of making an anion-responsive porous electrode comprising the steps of dispersing colloidal-size particles of activated charcoal and graphite in polyvinylimidazole quaternized with methyl iodide, impregnating a backing material with said dispersed charcoal and graphite, and then drying said impregnated backing material to complete formation of the electrode;

It is still another further object of the invention to provide a method of making an anion-responsive porous electrode comprising the steps of dispersing colloidal-size activated charcoal and graphite in polyvinylimidazole quaternized with a compound selected from the group consisting of alkylhalides and alkylsulfates, impregnating a backing material with said dispersed charcoal and graphite, and then drying said impregnated backing material to complete formation of the electrode;

Another object of the invention is to provide a method of making anion-responsive porous electrodes comprising the steps of dispersing colloidal-size particles of activated charcoal and graphite in a solution of polyvinylpyride quaternized with a compound selected from the group consisting of alkylhalides and alkylsulfates, impregnating a fiberous material with said dispersed charcoal and graphite and drying said fiberous material to complete formation of the electrodes;

It is still a further object of the invention to provide an anion-responsive electrode of carbon and graphite treated with organic amine compounds containing quaternized nitrogen which is dispersed in a backing material with an organic polyelectrolyte having quaternized nitrogen groups thereon;

Other objects and advantages of the invention will be apparent from the following detailed description in conjunction with the appended claims and the drawings wherein:

FIGURE 1 is a block diagram of the method of making the anion-responsive electrode;

FIGURE 2 is a cross-sectional view of the anion-responsive electrode having a porous backing material impregnated with colloidally dispersed carbon and graphite; and FIGURE 3 illustrates diagrammatically the anion-responsive electrodes of the invention in a saline water demineralization unit.

The anion-responsive electrode illustrated in FIGURE 1 is prepared in the manner herenow described. The carbon of the electrode is prepared by mixing two parts of activated charcoal such as Norit and one part graphite such as Dixon Air-Spun type 200–10. The carbon and graphite may be of any colloidal particle size for example between 0.1 to 1 micron. The finely divided graphite and charcoal are agitated together until an intimate dry mixture thereof is achieved.

Next an organic polyelectrolyte which has a quarternary nitrogen group thereon is made into approximately a 50% water solution. The quantity of organic polyelectrolyte utilized in making the solution is equivalent to about 5% by weight of the dry carbon mixture. Two suitable organic polyelectrolytes which may be used are polyvinylimidazole-methiodide (PVI–I) and polyvinylpyridiniumiodide (PVP–I). These organic polyelectrolytes are formed by quaternizing with alkylhalides or alkylsulfates. The structural formulae for polyvinylimidazole and polyvinylpyridine before and after quaternization with an alkylhalide (RA) are listed as follows:

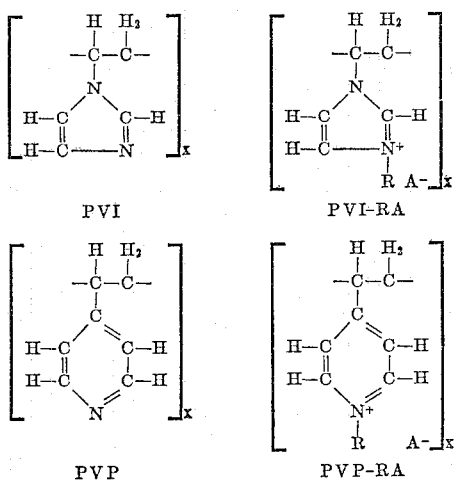

PVI    PVI-RA

PVP    PVP-RA

After the solution of the organic polyelectrolyte has been prepared, the solution is added to the carbon mixture to form a colloidal dispersion. The carbon mixture is thoroughly dispersed in the solution, for example with a mortar and pestle, after which it is allowed to digest for several hours. After the dispersion has been made, it is diluted with ½ to 1 part water per 1 part dispersion. The dispersion is spread on a backing material such as Dacron felt or paper and pervades therein. Any fibrous material which will not swell in water is suitable for the backing material. The backing material with the dispersion spread thereon is allowed to air dry at approximately 25° C. until it is no longer tacky. The electrode as formed with the backing material may then be placed in a basic solution, such as ammonium hydroxide, to improve the stability of the electrode when used as a demineralization electrode.

After being immersed in the stabilizer, if this step is used, the electrode is placed in an oven and dried at about 110° C. for approximately one to two hours which removes substantially all of the residual moisture therein whereby the colloidal dispersion coagulates on the backing material. The electrode formed as above is anion-responsive.

The completed anion-responsive electrode impregnated with the organic polyelectrolyte dispersion of the carbon and graphite is illustrated in FIGURE 2.

In order to provide an electrochemical demineralization cell both a cation-responsive and anion-responsive electrode must be utilized. A cation-responsive electrode may be made in any suitable manner which is well known in the art. Graphite, for example Aquadag a trademark for colloidal graphite or Dixon Air-Spun graphite type 200-10, is immersed in a solution of 3 parts concentrated sulfuric acid to 1 part concentrated nitric acid for about 5 to 10 minutes. It is then washed with distilled water and the resulting carbon material is dispersed in a solution of about 2 to 5% tannic acid by weight of the carbon material. A fiberous backing material such as Dacron felt is then impregnated with the graphite dispersion, air dried at about 25° C. until it is no longer tacky, and then it is oven dried at about 110° C. for several hours to remove substantially all of the residual moisture.

FIGURE 3 illustrates diagrammatically a demineralization cell. The cell has a shell 1 which may be either plastic or metal as desired provided that bare metal is not exposed to the solution. The shell 1 is provided with an inlet 2 for saline water and an outlet 3 for purified water. The anion-responsive electrode 4 is separated from the wall of the shell 1 by insulation 5. It is held in place by electrical contact 7 extending through the wall of shell 1 and firmly attached by bolt 8 against insulating washers 6. The interior contact exposed to solution must be electrochemically inert. A wire 18 electrically connects the contact 7 to the positive side of battery 20. The cation responsive electrode 10 is separated from the wall of cell 1 by insulation 11. Electrical contact 14 holds electrode 10 against the insulation 11 and is rigidly attached by bolt 13 against insulating washer 12. Wire 19 electrically connects the contact 14 to the negative side of battery 20. The electrodes may be conventionally regenerated by merely reversing the potential in the presence of a reject solution.

In the demineralization cell as above described, various samples of the anion-responsive electrodes absorbed approximately $10^{-4}$ anion equivalents per gram of dry carbons.

The following are specific examples of anion-responsive electrodes made in accordance with the invention. In these examples five anion-responsive electrodes were made by dispersing 2 gram samples each containing mixed Norit-A activated charcoal and Dixon Air-Spun graphite in a 3 to 1 ratio of charcoal to graphite with a mixture of polyvinylimidazole (PVI) and polyvinylimidazole-methiodide (PVI-I) in a water solution. The total weight of dispersant for each sample was made to be 10% PVI-I by weight of carbons. The dispersion was applied to Dacron felt patches, 1 inch wide and 1.5 inches long. The Dacron felt patches impregnated with the dispersion of carbon and graphite were air dried until they were no longer tacky, after which the patches were oven dryed at 110° C. for 45 minutes to complete formation of anion-responsive electrodes. The electrodes were compressed by passing through rollers.

The anion-responsive electrodes were used with the cation-responsive electrode hereafter described to demineralize a 0.03 N sodium chloride solution. The electrode potential was maintained at 0.6 volt D.C. of all demineralization cycles.

The cation-responsive electrodes used with the anion-responsive electrodes of the specific examples were made from a mixture of Norit-A and one part Dixon Air-Spun graphite fabricated into electrodes as hereinbefore described utilizing a water solution of 5% tannic acid by weight base on the carbon as the dispersant. These cation-responsive electrodes had a capacity of about $9 \times 10^{-4}$ cation equivalents per gram of carbon material.

The specific anion-responsive electrodes with the demineralization operating conditions and results are contianed in Table I as follows:

TABLE I

| Sample No. | Dispersant composition (mole percent) | | Dispersant dry weight (grams) | Electrode thickness (inches) | Volume flow rate of 0.03 N NaCl through cell, ml./hour | Anion-equivalents adsorbed per $10^4$ grams of dry carbon |
|---|---|---|---|---|---|---|
| | PVI | PVI-I | | | | |
| 1 | 7.0 | 3.0 | 0.6957 | 0.0381 | 9.49 | 1.11 |
| 2 | | 10.0 | 0.8300 | 0.0408 | 9.52 | 1.68 |
| 3 | 7.5 | 2.5 | 0.5477 | 0.0551 | 4.77 | 0.605 |
| 4 | 5.0 | 5.0 | 0.4880 | 0.0514 | 5.06 | 0.514 |
| 5 | 2.5 | 7.5 | 0.4600 | 0.0462 | 4.98 | 0.862 |

Other anion-responsive electrodes are fabricated by dispersing colloidal-size particles of carbon and graphite in polyvinylimidazole quaternized with methylsulfate. Several anion-responsive electrodes were fabricated from Dixon Air-Spun graphite dispersed in 6.6%, 6.0% and 5% PVI-sulfated by weight based on dry carbon. These electrodes were comparable in capacity to the PVI–I electrodes with approximately $10^{-4}$ anion equivalents adsorbed per gram of carbon.

Although the invention has been disclosed with certain specific embodiments using mixtures of activated charcoal and graphite, conductive carbons, such as carbon black from oil which is often referred to as "oil furnished black" and carbon black from natural gas which is referred to as "channel black" that are produced by burning the materials in an atmosphere of insufficient oxygen for complete combustion, may be used equally as well. Such carbon blacks could readily be used in lieu of the charcoals and graphites described herein.

It will be appreciated that various modifications and changes to the invention will be apparent to those skilled in the art and such are within the spirit and scope of the present invention as disclosed herein and defined by the appended claims.

What is claimed is:

1. An anion-responsive electrode for a demineralization cell comprising a porous, fibrous material impregnated with a dispersion of colloidal-size particles of conductive carbon dispersed by a water soluble organic polyelectrolyte having quaternized nitrogen groups which dispersion-impregnated material is dried to remove substantially all the moisture therein whereby the colloidal dispersion coagulates on the material.

2. An anion-responsive electrode for a demineralization cell comprising a porous, fibrous material impregnated with a dispersion of colloidal-size particles of a mixture of carbon and graphite dispersed with quaternized polyvinylimidazole which dispersion-impregnated material is dried to remove substantially all the moisture therein whereby the colloidal dispersion coagulates on the material.

3. The anion-responsive electrode of claim 2 wherein the carbon is activated charcoal and the mixture contains three parts activated charcoal and one part graphite by weight.

4. The anion-responsive electrode of claim 2 wherein the polyvinylimidazole is quaternized by methyl sulfate.

5. The anion-responsive electrode of claim 2 wherein the polyvinylimidazole is quaternized by a methyl halide.

6. The anion-responsive electrode of claim 5 wherein the methyl halide is methyl iodide.

7. An anion-responsive electrode for a demineralization cell comprising a porous, fibrous material impregnated with a dispersion of colloidal-size particles of carbon and graphite dispersed with quaternized polyvinylpyridine which dispersion-impregnated material is dried to remove substantially all of the moisture therein whereby the colloidal dispersion coagulates on the material.

8. The anion-responsive electrode of claim 7 wherein the polyvinylpyridine is quaternized with a methyl halide.

9. The method of making an anion-responsive electrode for a demineralization cell comprising the steps of dispersing a mixture of colloidal-size particles of conductive carbon in a water-soluble organic polyelectrolyte containing a quaternized nitrogen group, impregnating a porous, fibrous material with the dispersed carbon, air drying the fibrous material, and oven drying the impregnated fibrous material to remove substantially all the residual moisture content therein whereby the colloidal dispersion coagulates on the material to complete the formation of the electrode.

10. The method of making an anion-responsive electrode for a demineralization cell comprising the steps of dispersing a mixture of colloidal-size particles of graphite and carbon in quaternized polyvinylimidazole, impregnating a porous, fibrous material with the dispersed graphite and carbon, air drying the fibrous material, and oven drying the impregnated fibrous material to remove substantially all residual moisture whereby the colloidal dispersion coagulates on the material to complete the formation of the electrode.

11. The method of claim 10 wherein the carbon is activated charcoal and the mixture contains three parts activated charcoal to one part graphite by weight.

12. The method of claim 10 wherein the polyvinylimidazole is quaternized with an alkyl halide.

13. The method of claim 10 wherein the alkyl halide is methyl iodide.

14. The method of making an anion-responsive electrode for a demineralization cell comprising the steps of dispersing a mixture of colloidal-size particles of graphite and carbon in quaternized polyvinylpyridine, impregnating a porous, fibrous material with the dispersed graphite and carbon, air drying the fibrous material, and oven drying the impregnated fibrous material to remove substantially all residual moisture whereby the colloidal dispersion coagulates on the material to complete formation of the electrode.

15. The method of claim 14 wherein the polyvinylpyridine is quaternized with methyl halide.

References Cited by the Examiner

UNITED STATES PATENTS 3,032,600   5/1962   Mayer _____ 136—137

FOREIGN PATENTS 564,923   7/1957   Italy.

JOHN H. MACK, *Primary Examiner.*

D. R. JORDAN, *Assistant Examiner.*